Feb. 28, 1967 W. M. McCONNELL 3,306,434
WALKING BEAM APPARATUS
Filed Oct. 22, 1965 3 Sheets-Sheet 1
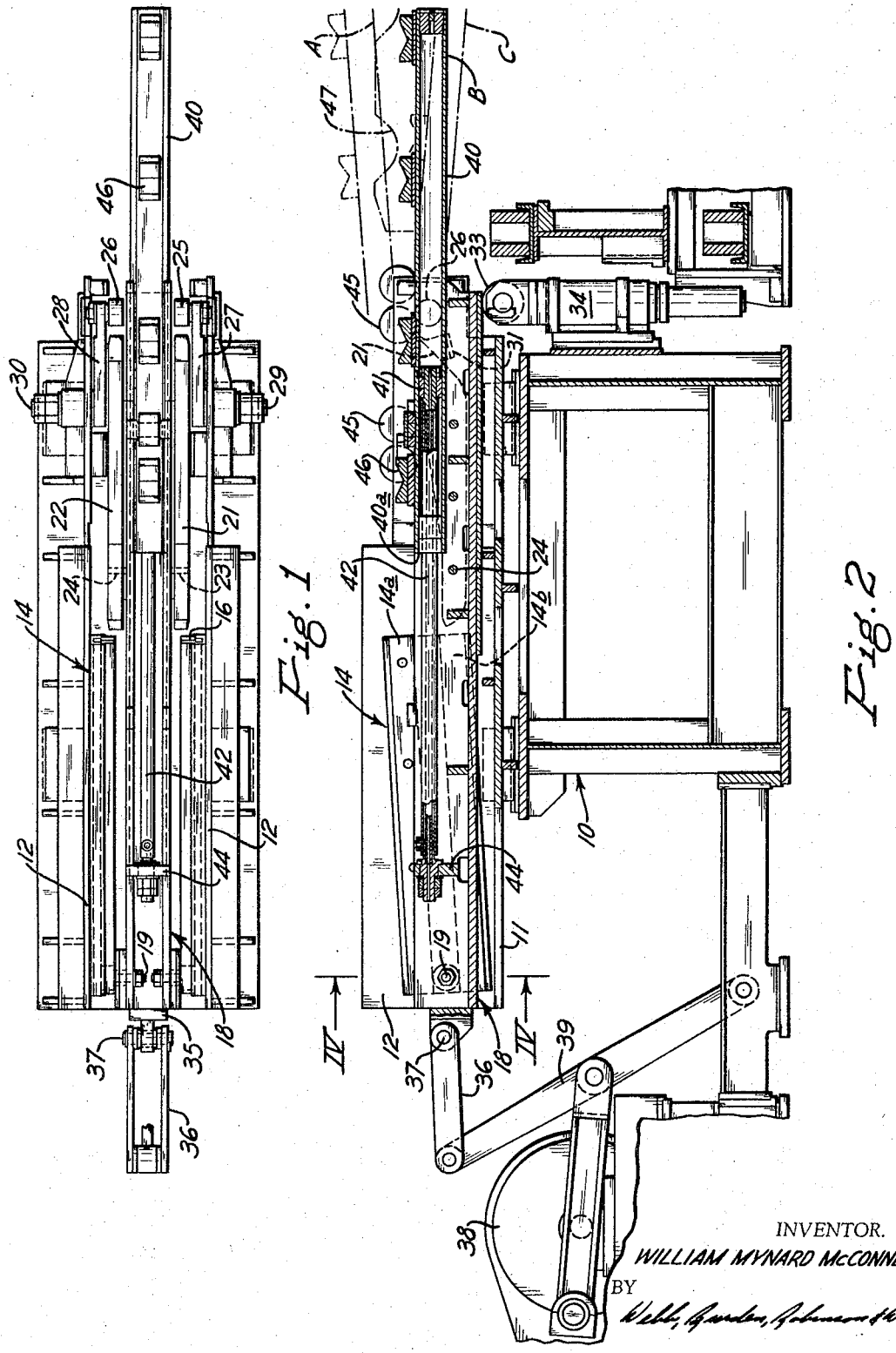
INVENTOR.
WILLIAM MYNARD McCONNELL
BY
ATTORNEYS.

Feb. 28, 1967 W. M. McCONNELL 3,306,434
WALKING BEAM APPARATUS
Filed Oct. 22, 1965 3 Sheets-Sheet 3

INVENTOR.
WILLIAM MYNARD McCONNELL
BY
ATTORNEYS.

United States Patent Office 3,306,434
Patented Feb. 28, 1967

3,306,434
WALKING BEAM APPARATUS
William Mynard McConnell, Pittsburgh, Pa., assignor to Taylor-Wilson Manufacturing Company, Pittsburgh, Pa., a corporation of Pennsylvania
Filed Oct. 22, 1965, Ser. No. 500,868
3 Claims. (Cl. 198—219)

This invention relates to material handling devices and more particularly to walking beam apparatus for moving pipe or tube products from one work station to another.

In a continuous pipe processing line, each length of pipe must undergo several manufacture and inspection operations such as facing, threading and testing, each operation being carried out at different spaced work stations. Adjacent each station is a longitudinally extending stationary pipe support structure, the top or table of which is formed by pairs of spinner rolls disposed in tandem. The spinner rolls are located such that the pipe is laterally positioned on the rolls to be fed directly into the processing or testing machine located at that station. When a pipe length is to be moved from one work station to the next succeeding station or to a receptacle, it is necessary to utilize apparatus such as a walking beam to raise the pipe from the spinner rolls adjacent the one work station an advance it to pair of rolls or to a receptacle adjacent the next work station.

Heretofore, walking beams have generally been operated by two independent power sources. One power source advanced the beam longitudinally from one work station to another and the other power source raised and lowered the beam. A single power source has also been employed to advance the beam along a set of horizontal rails and lifting of the beam has been effected by moving it onto and along built-up portions of the rails. Present methods have not proven wholly satisfactory, however, because the beam follows the same path on the return stroke to the first work station as on the forward stroke and thereby interferes with the continuity of material flow on the support table adjacent the first work station.

I have invented a walking beam apparatus which uses a single source of power to both advance and raise the beam; which advances and raises simultaneously to move a workpiece; which is effective to accurately move a workpiece from one work station to another above the work support table; which is adjustable to properly position a workpiece at a work station; which retracts beneath the level of the spinner rolls and the work stations; and which is adapted to handle a number of workpieces simultaneously during each stroke.

Basically, my invention is directed to a walking beam apparatus for moving an elongated workpiece transversely of its longitudinal axis from a first work station to a second spaced apart station. My apparatus includes a longitudinally extending beam member having a workpiece supporting portion to carry the workpiece in travel from the first station to the second station. The beam member is movably mounted in a frame for horizontal and vertical travel between the stations. A cam is supported by one of the frame and the beam member, and a cam follower is supported by the other of the frame and the beam member. The beam member is adapted to be connected to power means to move the beam member between a first position where a portion of the beam member engages the workpiece and is below the first station, and a second position where the beam portion has advanced to and is below the second station. The cam has a position relative to the cam follower and a peripheral shape such that when the beam member advances from the first position toward the second position, the cam and cam follower engage and the beam rises, picks off a workpiece from the first station and delivers it to the second station. The cam has a length relative to the distance between the first and second stations such that when the workpiece substantially has reached the second station, the cam and cam follower disengage and the beam member falls below the second station. Since the beam is below the work stations, it is returned to its original position below the work station without interfering with material located at the first station.

In the accompanying drawings, I have illustrated certain presently preferred embodiments of my invention in which:

FIGURE 1 is a plan view of my invention;

FIGURE 2 is a partial section of my invention taken along the central longitudinal axis of FIGURE 1, showing the hydraulic means and including illustrative alternate positions of the walking beam of my invention;

Figure 3:
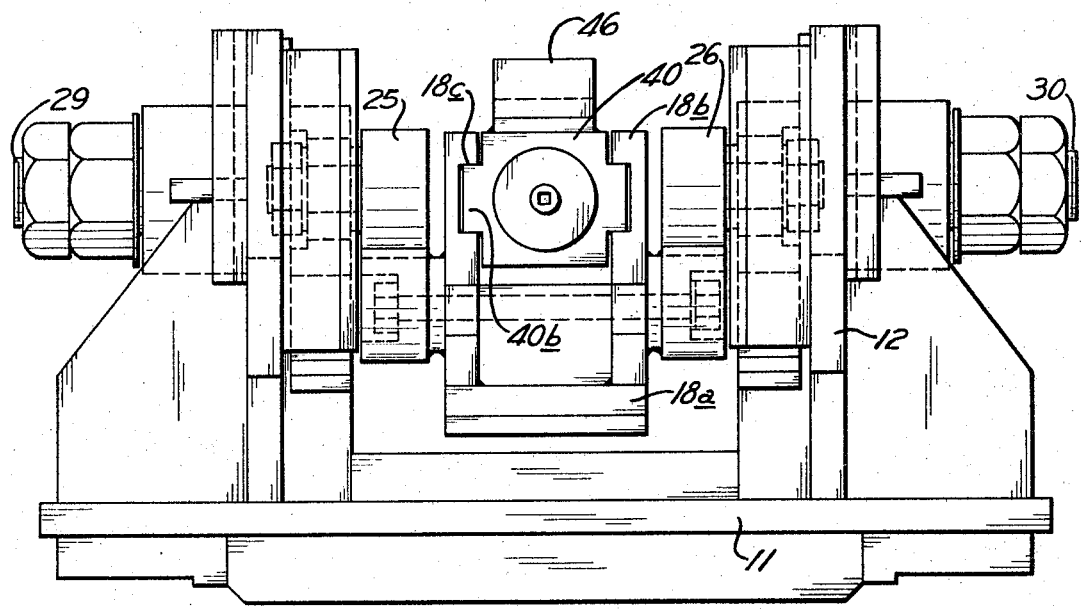
FIGURE 3 is an enlarged end view of the beam as seen from the leading end.
Figure 4:
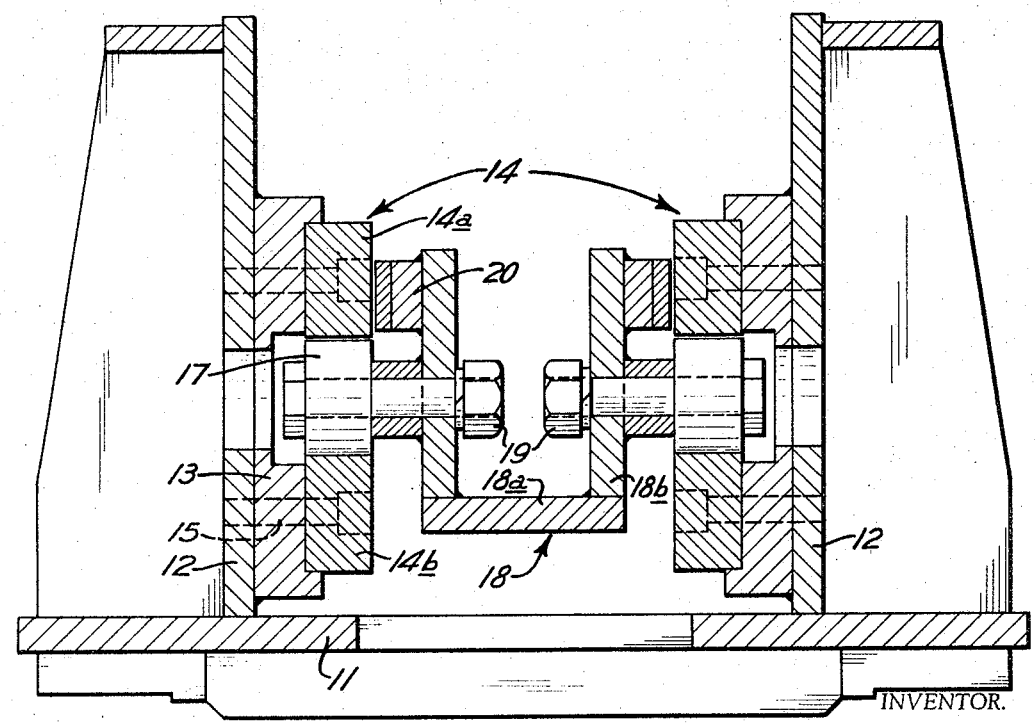
FIGURE 4 is an enlarged section view taken along line IV—IV of FIGURE 2.

Referring to FIGS. 1–4, a stationary frame 10 supports the walking beam of my invention. The frame 10 includes a base 11 and upstanding parallel walls 12. Spacing blocks 13 are secured to the walls 12 at one end of the frame. An elongated inclined track 14 is attached at its lower end to the spacing blocks 13 by bolts 15 and at its upper end to the wall 12 by pins 16.

Each rail of the inclined track comprises a pair of longitudinal members 14a and 14b of rectangular cross-section arranged parallel to and in spaced relation with one another a distance sufficient to include the diameter of rollers 17 which are retained therebetween. A U-shaped channel 18, having a base 18a and legs 18b, is pivotally secured to the rollers 17 by bolts 19 located adjacent its trailing end such that the trailing end of the channel is pivotally mounted in respect of the track and the channel is disposed to travel up and down the inclined track rails. Shoes 20 are secured to the outside of channel legs 18b to maintain the lateral alignment of the channel 18 on the track.

Elongated cams 21 and 22 are rigidly mounted to the outside of legs 18b at the leading end of channel 18 by bolts 23 and 24. The length of the cams is dependent upon the distance between work stations as will be described in detail hereinafter. Roller cam followers 25 and 26 attached to the ends of arms 27 and 28, respectively, as shown in FIG. 1 and the arms are pivotally secured to the frame walls 12 by bolts 29 and 30. The arcuate travel of each arm about its bolt is restricted by a stop 31. A snubber roller 33 is mounted on a shock absorber or dashpot 34 which is secured to the frame 10 below the cam followers. The arms 27 and 28 carrying the cam followers are pivotally mounted on the frame to allow the cam followers to move upwardly when contacted by the cams 21 and 22 upon retraction of the beam in the manner described hereinafter.

While I have shown and described the cams 21 and 22 as being secured to the channel 18 and the cam followers 25 and 26 as being supported on the frame 10, it will be readily apparent that changing the positions of the cams and cam followers is nothing more than a kinematic inversion and is within the scope of my invention. Specifically, the cams 21 and 22 may be mounted on the frame 10 and the cam followers 25 and 26 may be supported by the channel 18 to cooperate in the same manner as the structure shown in FIGS. 1–4.

A block 35 is secured to the trailing end of channel 18 as by welding and a crank 36 is attached to the block 35 by a bolt 37. The crank 36 is pivotally attached to a link 39 which in turn is operatively connected to a driving wheel 38 so that rotation of the wheel by a motor or other power means activates the link and the crank to move the channel.

A member 40 having a cylindrical bore closed at both ends is slidably disposed on a piston 41 and a piston rod 42 extends rearwardly from the piston, through one end 40a of the member 40 and is secured to a channel flange 44 affixed to the base 18a of channel 18. Member 40 is keyed to the channel 18 as shown in FIGURE 3, details of which will be explained hereinafter. The channel 18 carrying the member 40 comprises a walking beam. Though I have described herein a beam member comprising a channel 18 and a member 40, it will be understood that a one-piece beam adapted for lifting a workpiece can also be employed for the purpose of my invention.

Spinner rolls 45 located at a work station along the top or table of the stationary pipe support structure carry the lengths to be transferred by the walking beam. Saddles 46 secured to the top surface of the member 40 are U-shaped in cross-section to cradle laterally a length of pipe when it is moved from work station to station. Upon advance of the beam, the pipe lengths are carried forward on the saddles 46 and delivered to another set of spinner rolls at the next work station or to a receptacle 47 such as shown in FIG. 2.

The peripheral shape of the cams 21 and 22 is such that when the beam advances from one work station toward the next, the cams engage the cam followers 25 and 26 and the beam rises, picks a length of pipe from the spinner rolls 45, carries it to the receptacle 47 and lowers it to the receptacle. The leading end of each cam slopes downwardly and rearwardly so that upon engagement with the corresponding cam follower the cam rides up and onto the cam follower. The lower edge of the central portion of each cam is substantially horizontal; thus, the beam travel is substantially horizontal as the beam advances longitudinally on the cam follower toward the second work station or receptacle. The trailing end of each cam is curved or sloped upwardly and rearwardly so that as the leading end of the beam reaches the receptacle, the cam rides oves the cam follower and the beam end falls beneath the work stations.

Referring particularly to FIG. 3, the member 40 is mounted on channel 18 by opposed longitudinally extending ribs 40b which slidably engage complementary grooves 18c formed in the legs 18b of the channel 18. Thus, the member 40 is disposed to travel forwardly and rearwardly on the piston upon conventional application of hydraulic fluid under pressure into the cylindrical bore of the member 40.

The travel of the cams during the operation of the beam is cyclic from a rest position through an advancing and retracting path back to rest. In the embodiment shown in FIGS. 1–4, the leading end of the channel 18 is supported in travel by the snubber roller 33 and the cam followers 25 and 26, and the trailing end of the channel is pivotally and slidably maintained on the inclined track by the rollers 17; thus, the channel is pivotally movable in a cyclic path. During forward movement the leading end of the channel moves on the snubber roller 33 until the leading ends of cams 21 and 22 contact the cam followers 25 and 26 at which point the cams ride over the followers. As the channel advances, its trailing end, being pivoted about the bolts 19, rides up the inclined track on the rollers 17. The beam drops onto the snubber roller 33 and is carried during retraction by the snubber roller 33 and the rollers 17 riding in the track 14.

Referring particularly to FIG. 2, illustrative path positions of the beam are identified at A, B and C. In position B, the rest position, the beam is retracted; however, the saddle-carrying member 40 is fully extended. Position A is reached by operating the crank 36 to advance the channel 18 moving the cams up to and upon the roller cam followers, thereby raising the beam and lifting a pipe length from the spinner rolls 45 and into a saddle 46. The pipe is then carried forward and delivered to the receptacle 47 upon continued movement of the crank. At position C, the beam has pivoted about its trailing end, the end of each cam has fully passed over its follower, the leading end of the beam has fallen below the receptacle, and the beam is supported by the snubber roller 33 and rollers 17 on which it will fully retract to rest position B.

In operation, the member 40 usually is fully extended so that all available saddles can be used to transport pipe. However, the extended length of the beam may be varied hydraulically to use a lesser number than all of the available saddles.

Figure 5:
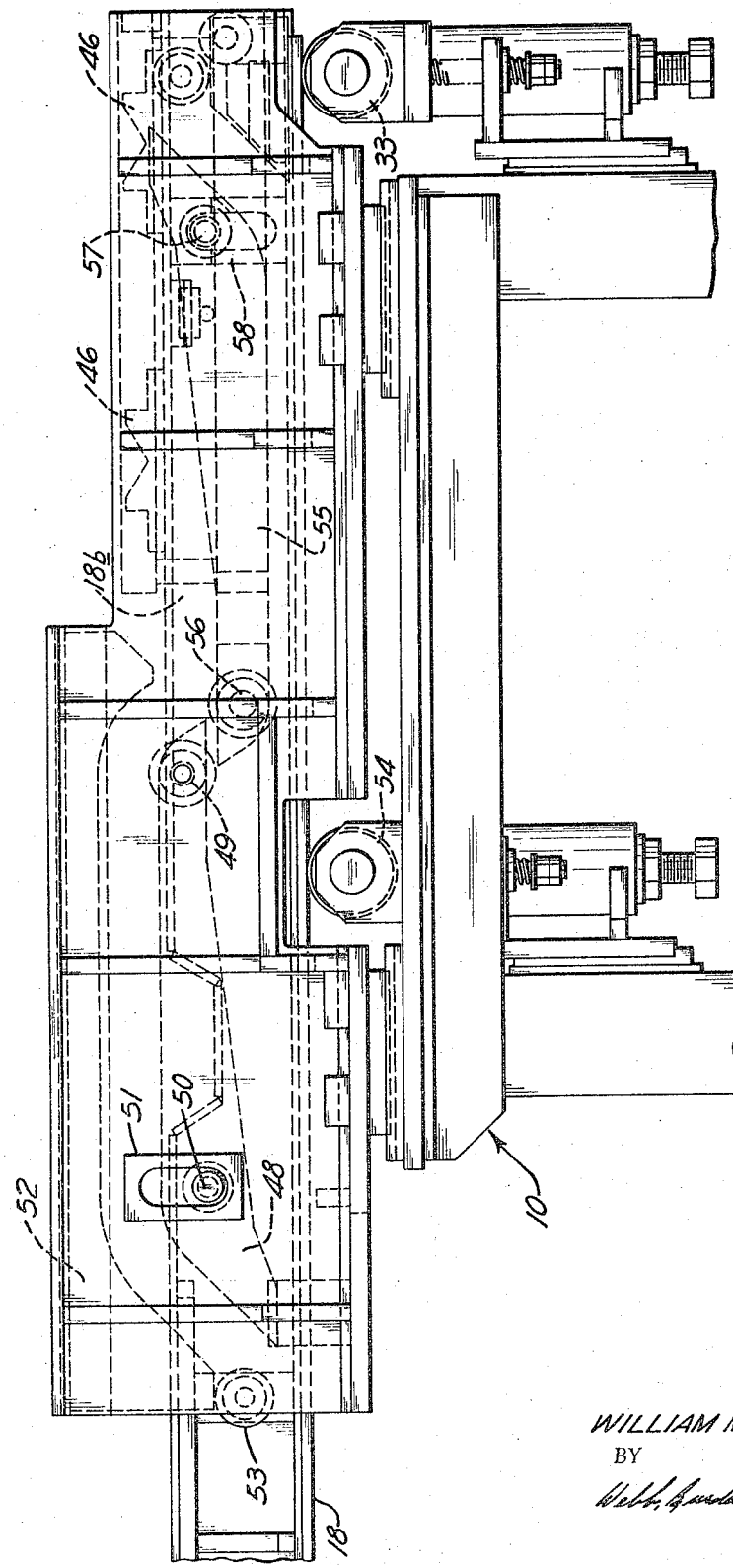
FIGURE 5 is an elevation view of a modification of my invention.

FIGURE 5 shows a modification of my invention in which the track 14 and rollers 17 shown in FIGURES 1–4 are replaced by a second cam-follower arrangement. In referring to FIGURE 5, the same reference numerals have been used as in FIGURES 1–4 where the parts are the same. Specifically, on each side of the channel 18 a cam 48 is secured adjustably to the frame 10 by a bolt 49 at the leading end and a bolt 50 and bracket 51 at the trailing end. A plate 52 having an edge configuration complementary to the surface or periphery of the cam 48 is mounted on the frame spaced above each cam and cooperates with the cam to define a track. Roller cam followers 53 are secured to the channel 18 in a manner similar to the attachment of rollers 17 in FIG. 4 and ride in the tracks formed by the cam surfaces and the plate edges. A rear snubber roller 54 is provided adjacent the leading end of the cams to receive the trailing end of the beam after the roller cam followers 53 have passed completely over the cams 48. A forward cam 55 of the FIGURE 5 modification is adjustably mounted to the outside of a channel leg 18b by a bolt 56, and a bolt 57 and a bracket 58. The operation of the forward cam 55 is the same as shown in FIGS. 1–4 and described heretofore.

The peripheral shape of each cam 48 is such that when the beam advances from one work station to another, the roller cam followers engage the cams, ride up the cam surface and fall off the leading end of each cam. Particularly, the trailing end of each cam 48 is sloped or inclined upwardly and forwardly so that upon engagement with the corresponding cam follower 53 the cam follower rides up and onto the cam. The upper edge or surface of the central portion of each cam 48 is substantially horizontal; thus, the beam travel is substantially horizontal as the cam follower 53 advances longitudinally along the corresponding cam toward the second work station. The leading end of each cam 48 is curved or sloped downwardly and forwardly so that as the beam reaches the second work station or receptacle, the cam follower 53 rides off its cam 48 and the end beam falls beneath the work stations onto the snubber roll 54.

The operation of the modified arrangement shown in FIGURE 5 is substantially the same as that of the structure shown in FIGURES 1–4 in that the channel 18 is advanced by a crank over the forward cam 55 as heretofore discussed. The cam followers 53, however, ride over the cams 48 rather than sliding up an inclined track (as in FIGURES 1–4) and the beam, upon completion of the operation, falls onto and returns entirely on the snubber rollers 33 and 54.

From the foregoing, it is apparent that I have invented a novel walking beam apparatus by which a pipe or tube product may be transferred from one work station to another accurately and efficiently. Particularly, I have disclosed a beam which can be moved longitudinally and vertically to effect a desired movement of the workpiece; and which falls beneath the selected receptacle after delivery of the piece so that it can return to its original position below the work stations.

Further, I have provided hydraulic means to add to the versatility of my device. By varying the extended beam length, the number of operative pipe-lifting saddles may be varied, permitting the use of my beam in confined work areas, or in situations when it is desired to change the distance between operative work stations.

The advance and return mechanism herein disclosed makes my beam available for material handling as required. Yet, during the return stroke and at rest, my walking beam remains below the work stations where it will not interfere with continuity, effectiveness and safety of operation.

While I have shown and described preferred embodiments of my invention, it is to be understood that they may be otherwise embodied within the scope of the following claims.

I claim:
1. Walking beam apparatus for moving an elongated workpiece transversely of its longitudinal axis from a first station to a second spaced-apart station comprising
 (A) an elongated beam member including
  (1) a leading end for engaging and supporting a part of a workpiece in travel from said first station to said second station; and
  (2) a trailing end axially coextensive with said leading end;
 (B) a frame removably mounting said beam member for horizontal and vertical travel between said first and second stations;
 (C) at least one cam fixedly mounted on one of said frame and the leading end of said beam member;
 (D) at least one cam follower mounted on the other of said frame and the leading end of said beam member for engagement and disengagement with said cam upon forward travel of said beam member from a first position to a second position;
 (E) power means connected to said trailing end of the beam member for simultaneously moving said beam member horizontally and vertically between said first position at which said leading end of the beam is below said first station and said second position at which the leading end of the beam member has advanced to and is below said second station;
 (F) said cam being positioned relative to said cam follower and having a peripheral shape such that when the leading end of said beam member advances from said first position toward the said second position, the cam and cam follower engage, raising the leading end of the beam member to pick off a workpiece at said first station;
 (G) said cam having a length relative to the distance between said first and second stations such that upon continued advance of the beam member, the cam and cam follower disengage when said workpiece has substantially reached said second station and the beam member falls below the second station to deliver the workpiece to said second station;
 (H) means on said frame for supporting said beam member during retraction from said second position to said first position, said fixed cam passing beneath said cam follower upon return of the beam member from said second position to said first position.

2. Walking beam apparatus as set forth in claim 1 and including guide means on the trailing end of the beam member for pivotally mounting said beam member in said frame, said guide means comprising;
 (A) a forwardly and upwardly extend track being attached to said frame adjacent the trailing end of said beam member,
  (1) said track being formed by a pair of spaced-apart rails;
  (2) each of said rails including a pair of spaced parallel members;
 (B) rollers mounted on said trailing end of said beam member and engageable within said parallel members whereby said rollers travel in said track upwardly and forwardly upon advance of the beam member from said first position to said second station, and return in said track downwardly and rearwardly upon retraction of the beam member from said second position to said first position.

3. Walking beam apparatus as set forth in claim 1 and having
 (A) at least a second cam fixedly mounted on one of the frame and the trailing end of said beam member;
 (B) at least a second cam follower mounted on the other said frame and the trailing end of said beam member for engagement and disengagement with said second cam upon forward travel of said beam member from a first position to a second position;
 (C) said second cam having a position relative to said second cam follower and a peripheral shape such that when said beam member advances from said first position toward said second position, said second cam and second cam follower engage, raising the trailing end of the beam member, said second cam having a length relative to the distance between said first and second stations such that upon continued advance of the beam member, the second cam and second cam follower disengage when said workpiece has substantially reached said second station, and the beam falls below the second station to deliver a workpiece to said second station, said second cam follower passing beneath said second fixed cam upon return of said beam member from said second position to said first position.

References Cited by the Examiner

UNITED STATES PATENTS

| | | | |
|---|---|---|---|
| 2,017,024 | 10/1935 | Cochran et al. | 198—219 X |
| 2,930,333 | 3/1960 | Leeuwrik | 198—219 X |
| 3,003,615 | 10/1961 | Ruppe | 198—219 |
| 3,066,760 | 12/1962 | Brigham et al. | 198—219 X |
| 3,161,284 | 12/1964 | Ashworth | 198—219 |
| 3,187,883 | 6/1965 | Umbricht | 198—219 |

EVON C. BLUNK, *Primary Examiner.*

M. L. AJEMAN, *Assistant Examiner.*